Sept. 5, 1933.  F. D. PFENING  1,925,601
AUTOMATIC HUMIDITY REGULATING MECHANISM FOR HEATING SYSTEMS
Filed Oct. 22, 1931  3 Sheets-Sheet 1
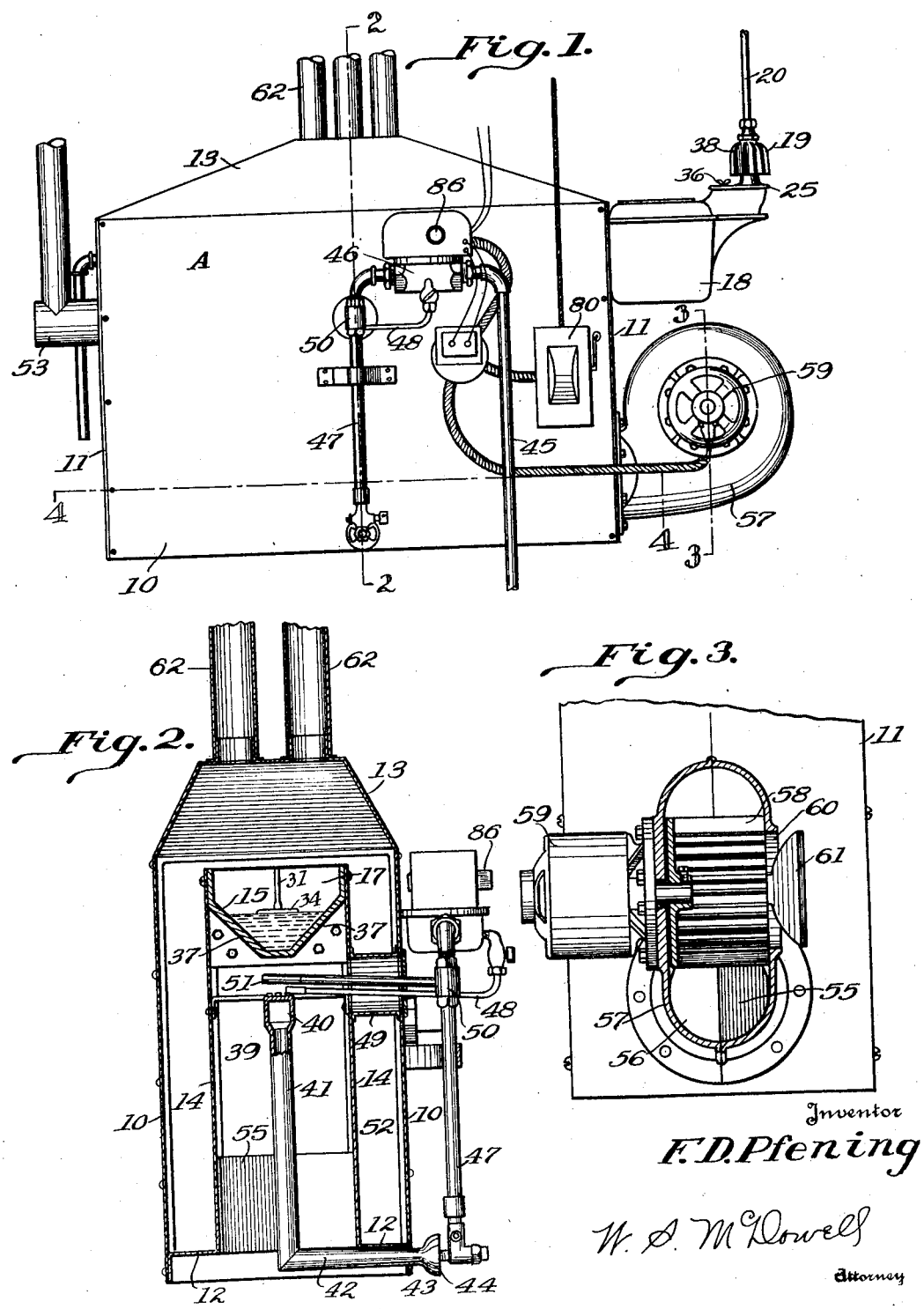
Inventor
F. D. Pfening
W. S. McDowell
Attorney Sept. 5, 1933.  F. D. PFENING  1,925,601
AUTOMATIC HUMIDITY REGULATING MECHANISM FOR HEATING SYSTEMS
Filed Oct. 22, 1931  3 Sheets-Sheet 2
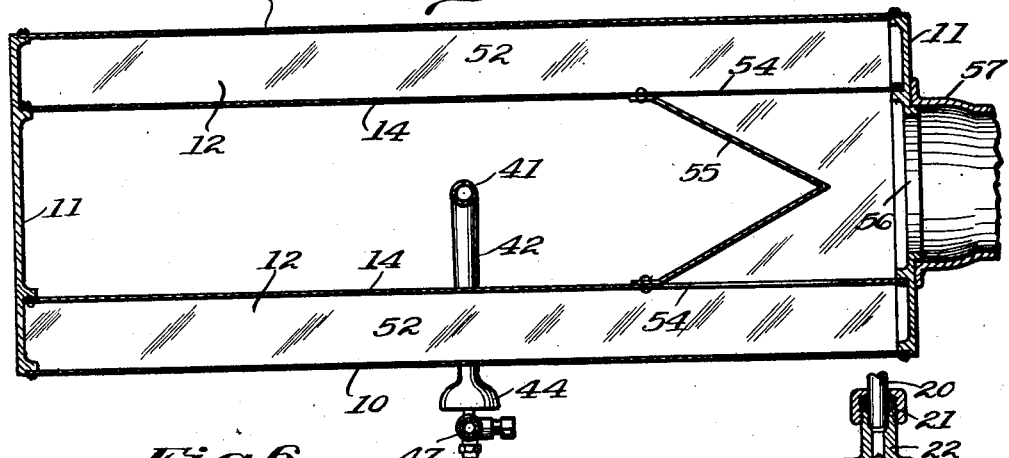
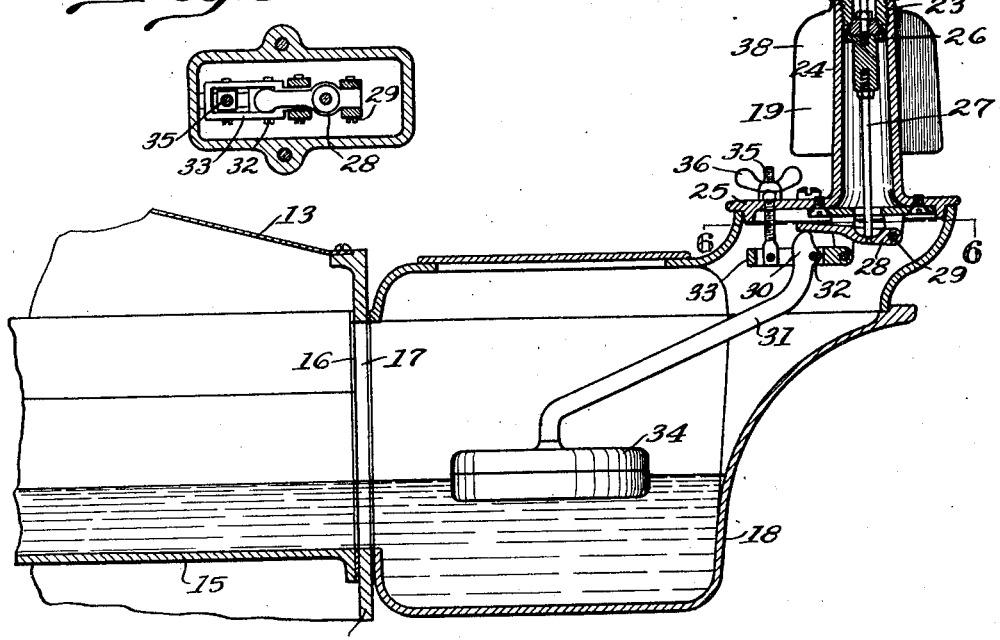
Inventor
F. D. Pfening
W. O. McDowell
Attorney Sept. 5, 1933.  F. D. PFENING  1,925,601
AUTOMATIC HUMIDITY REGULATING MECHANISM FOR HEATING SYSTEMS
Filed Oct. 22, 1931  3 Sheets-Sheet 3

Inventor
F.D.Pfening

By W. S. McDowell
Attorney

Patented Sept. 5, 1933

1,925,601

UNITED STATES PATENT OFFICE 1,925,601

AUTOMATIC HUMIDITY REGULATING MECHANISM FOR HEATING SYSTEMS

Frederic D. Pfening, Columbus, Ohio, assignor to The Fred D. Pfening Company, Columbus, Ohio, a corporation of Ohio Application October 22, 1931. Serial No. 570,422

3 Claims. (Cl. 126—113)

This invention relates to improved automatic humidity regulating mechanism for use in connection with heating systems used in residences and other buildings or enclosures.

The primary object of this invention is to provide positive automatic and efficient means for maintaining a substantially constant percentage of moisture in the artificially heated rooms of an inhabited building. Heating engineers recognize the desirability or necessity of supplying enclosed heated rooms with water vapor and many devices have heretofore been employed in connection with heating systems designed to attain this end. Many expedients have been resorted to, such, for example, as the provision of water receiving receptacles placed in the air circulating spaces of ordinary hot air types of heating furnaces, or the placing of water containing receptacles in various rooms where radiated heat is used in lieu of hot air circulation. Most of these earlier devices have proved unsatisfactory and inadequate in maintaining a desired water content or humidity in the atmosphere of the rooms of an inhabited building since such earlier devices necessitate attention and care which is quite likely to be overlooked or neglected and, furthermore, when automatic, such as when float controlled valve mechanism is used for automatically maintaining a constant level of water in a receptacle associated with a heating furnace, the amount of water vapor released by such a receptacle and delivered to the room atmosphere is insufficient to accomplish any substantial benefit.

The present invention therefore provides mechanism of a simple, compact and automatic character which may be readily placed in an out-of-the-way location in a building and wherein is provided a casing having an outlet for delivering moisture laden air to the room or rooms of the building and wherein the casing is provided with a water containing trough or receptacle so positioned as to be subjected to the heat of an automatically controlled gas burner wherein provision is made for automatically regulating the action of the gas burner by the use of a humidity actuated switch disposed in a room under control, the relationship of parts being such that when the humidity or moisture content in the room falls to a predetermined extent, the said switch is operated to turn on the gas burner so that the heat thereof may positively evolve water vapor from the receptacle, causing such vapor to be transmitted to the room or rooms, this action continuing until the water vapor reaches a desired percentage when the humidity switch is again operated to shut off the gas burner.

It is another object of the invention to provide the air inlet of the casing with a motor driven fan which is also subject to operation in accordance with the functioning of the humidity switch or control unit, whereby when said gas burner is in operation to positively develop water vapor, the said fan is simultaneously operated to cause the forced passage of air under pressure through the casing in order to pick up the generated water vapor and carry it to the room or rooms under control.

It is a further object of the invention to provide mechanism of the character aforesaid which is entirely automatic in its operation, requires little or no manual attention to keep the same in proper operating order, and which is both safe and reliable in attaining the ends specified.

With these and other objects in view, which will appear as the description proceeds, the invention consists in the novel features of construction, combination of elements and arrangements of parts hereinafter fully described and pointed out in the appended claims.

In the accompanying drawings:

Fig. 1 is a view in front elevation of the automatic humidity controlling mechanism comprising the present invention;

Fig. 2 is a transverse vertical sectional view taken through said mechanism on the plane disclosed by lines 2—2 of Fig. 1;

Fig. 3 is a similar view taken through the motor driven fan of the mechanism on the plane indicated by the line 3—3 of Fig. 1;

Fig. 4 is a horizontal sectional view taken through the casing structure of the mechanism on the plane indicated by the line 4—4 of Fig. 1;

Fig. 5 is a vertical sectional view disclosing more particularly the automatic valve mechanism for adjusting and maintaining constant the water level in the water receiving trough or receptacle of the mechanism;

Fig. 6 is a detail horizontal sectional view taken on the line 6—6 of Fig. 5;

Figure 7:
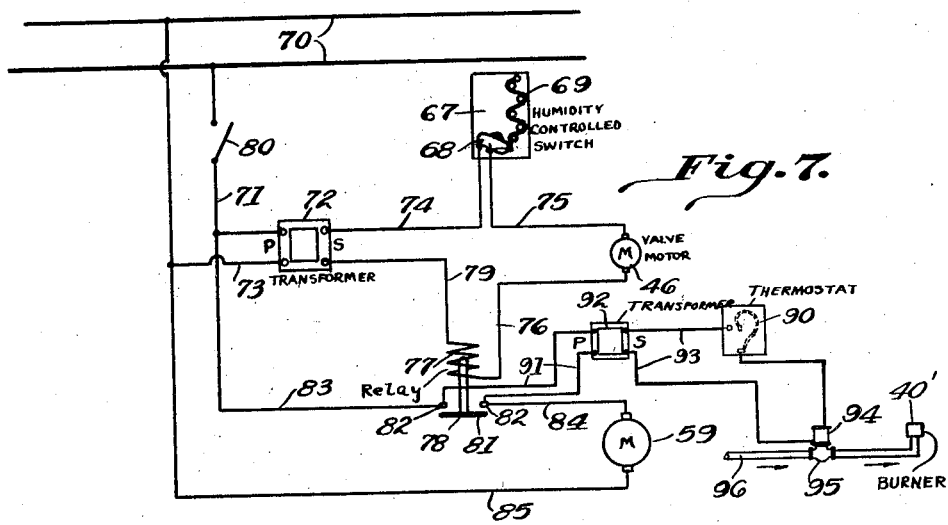
Fig. 7 is a diagrammatic view of the several electric circuits used in the automatic operation of said mechanism.

The improved automatic humidity regulating mechanism comprising the present invention has been disclosed in one of its preferred forms in the accompanying drawings and this preferred embodiment will be described in detail hereinafter, however, it will be understood that this form of the invention has been selected merely for purposes of convenience in description and illustration and not for purposes of limitation, since it will be apparent to those skilled in the art, as the description of the invention proceeds, that variations and modifications may be resorted to without departing from the essential features of novelty and operation.

In the particular form of the invention depicted, use is made of a substantially rectangular casing formed to include vertical side walls 10—10, vertical end walls 11—11, a horizontal bottom wall 12 and a substantially pyramidal hood 13 at the top. The end walls 11 may be in the form of metallic castings in order to give the structure strength and stability and yet to permit a large number of the walls of the casing to be formed from sheet metal. Secured to the end walls 11—11 and arising from the bottom wall 12 is a pair of spaced longitudinally extending vertical walls 14—14 and secured to and positioned between the upper portions of the walls 14 is an open topped water containing trough or receptacle 15. The ends of the trough 15 are flanged and engage with gaskets 16 positioned between said flanged ends and the adjacent surfaces of the walls 11. One end of the trough 15 is open and registers with a correspondingly shaped opening 17 formed in one of the end walls 11, and arranged in registration with the opening 17 on the outside of the casing, as shown in Figs. 1 and 5 is one side of the casing 18 of a float actuated valve mechanism 19.

The mechanism 19 has been specifically disclosed and constitutes the subject matter of a co-pending application filed jointly with Henry Pfening, Jr., Serial No. 546,350, June 23, 1931.

The purpose of this mechanism is to maintain a desired quantity or level of water in the trough 15 and to do this automatically. To this end a water supply pipe 20, leading from any suitable source of water supply, is connected through a packing gland 21 with a sleeve 22. This sleeve is threadedly carried as at 23 in connection with the upper end of a tubular extension 24 arising from the detachable top plate 25 of the casing 18. The sleeve 22 is provided with a valve seat with which engages a valve member 26. This member has connected thereto a rigidly depending stem 27 which, at its lower end, rests upon a lever 28 pivotally mounted as at 29 in connection with the plate 25. The free end of the lever 28 contacts with a cam 30 provided upon the upper end of a float arm 31 which is fulcrumed as at 32 upon an adjustable support 33. The lower end of the arm 31 carries a float 34 which is positioned in the water carried in the lower part of the casing or pot 18.

It will be seen that as the water level varies in the receptacle 15 and the pot 18, the arm 31 will rise and fall, thereby rocking the lever 28 and imparting corresponding vertical motion to the valve stem 27 in the valve member 26, so that when the water level recedes to a desired low point, the valve member 26 will be removed from its seat to permit of the inflow of water into the casing 18, through the opening 17 and into the trough 15, and, conversely, when a desired maximum water level has been reached, the valve member is operated to arrest further inflow of water by engaging with the seat. The water level is subject to variation by adjusting the pivoted support 33 which may be accomplished by means of a screw 35, which passes through an opening provided in the top plate 25 and receives a wing nut 36, which may be manually turned to vary the water level in the trough or receptacle 15 at will. Further, a distinguishing feature of the elongated open topped trough 15 resides in the provision of its downwardly converging and substantially V-shaped bottom walls 37, which provide for considerable variation in the amount of water which may be retained in the trough by the simple control of the wing nut 36, and this control may be used for the purpose of controlling the quantity of water vapor which is to be released from the trough when in operation. Other valve mechanisms may be used, in lieu of that shown herein for controlling the water level in the trough or receptacle 15 but I prefer to use the valve mechanism disclosed since it has the advantage, over other types of which I am aware, of positively opening and closing to admit and arrest the flow of water into the receptacle, and in a closed position does not admit of a slow leaking or passage of water through the valve. The extension 24 may be provided with a plurality of heat radiating fins 38 to keep the valve mechanism at all times in a cool condition, and to prevent deterioration of the compressible part of the valve member and to minimize deposits on water passages due to hardening of the lime content of the water used.

Below the trough or receptacle 15 and within a burner chamber 39 formed between the walls 14—14 and the walls 11—11, there is positioned an elongated burner 40. This burner is provided with a vertically disposed mixer manifold 41 which terminates at its lower end in a horizontally directed extension 42 arranged beneath the bottom wall 12 and projecting outwardly from the casing through an opening 43 formed in the bottom thereof, the outwardly projecting portion of said extension being terminated in an air inlet shell 44. The burner 40 is intended to burn gas as a fuel, and to this end a gas line 45, disposed exteriorly of the casing, has its upper end connected with an automatic motor valve 46. This valve is of standard construction and its details do not, per se, enter into the present invention, since this valve or its equivalent may be purchased on the open market. Such valves employ a motor adapted to be energized by the closing of an electrical circuit, as hereinafter defined. The operation of the motor in the valve results in the opening of valve passages or ports by which gas may flow from the line 45 through the valve 46 and thence into a downwardly extending branch 47, which terminates at its lower end in the mixer shell 44.

As shown in Figs. 1 and 2, the motor valve 46 is equipped on its inlet side with a pilot 48 which extends through a short conduit 49 arranged between certain of the walls 10 and 14. The pilot is positioned immediately above the burner head 40 and normally remains constantly lighted, so that when the motor valve is opened, ignition of combustible gases issuing from the burner head will take place immediately. If for any reason, the pilot should become extinguished, I provide the branch line 47, on the outlet side of the motor valve, with a safety valve 50. This valve is subjected to the operation of a thermostat 51 which extends through the conduit 49 in close proximity to the discharge end of the pilot 48. As long as the pilot is properly functioning, the thermostat control 51 remains at such a temperature as to keep the safety valve 50 open, but if the pilot should fail, the thermostat cools and automatically closes the valve 50, thus preventing accidental gas escape.

Figure 8:
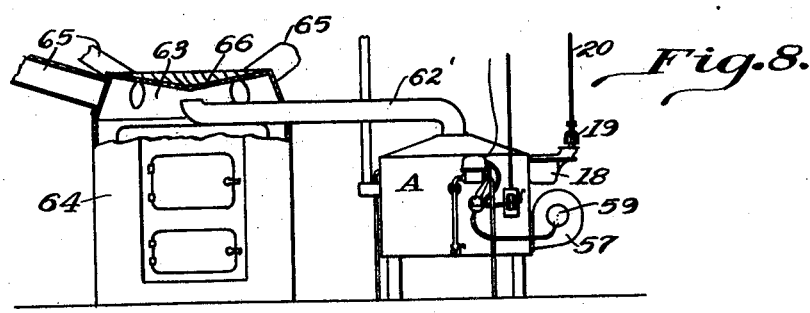
Fig. 8 is a detail view in elevation and partly in vertical section disclosing the improved humidifying system comprising the present invention when used in connection with the standard hot air type of furnace.

The burner chamber 39 is completely sealed from the air circulating chamber 52 formed in the casing by the provision of the walls 14—14, and the trough or receptacle 15. In one end, the said burner chamber is provided with a flue or gas outlet duct 53 which preferably leads to the atmosphere or to the chimney stack of an associated heating furnace. As shown in Fig. 4, the walls 14—14 are provided with openings 54 adjacent to one end of the casing, and to separate the burner chamber 39 from the air circulating chamber 52, there is provided a V-shaped vertical baffle 55. This baffle is situated so that its lower portion registers with an air inlet 56 formed in one of the end walls 11 contiguous to its lower end. Communicating with this inlet and directly secured thereto is the outlet of a fan casing 57 which is bolted to said end wall and is positioned below the casing 18. Within the fan casing is a turbine rotor 58 which is directly driven by an electric motor 59 mounted on one side of the fan casing, as shown in Fig. 3. Air is drawn into the fan, upon the operation of the rotor 58, through an axially disposed air inlet 60 formed in one of the side walls of the casing 57, and an adjustable closure 61 is mounted in connection with the inlet 60 to govern the volume of air drawn into the fan. The construction of the fan and its rotor is such as to positively deliver air under pressure to the main casing A through the air inlet 56. The air thus delivered strikes the V-shaped baffle 55 and is deflected to each side of the plates 14—14, passing upwardly through the air circulating chambers 52 arranged on each side of the plates 14 and thence around the open top of the trough or receptacle 15. At this point, the air has been heated to some extent by heat radiated from the walls 14, and as it passes over the open top of the trough or receptacle and into the hood 13, it picks up and entrains therewith water vapor positively evolved from said trough by the operation of the burner mechanism. This partially heated moisture containing air then passes from the casing A through one or more outlet ducts 62 which are connected with and arise from the top of the hood 13, and these ducts may extend to the various rooms of a building serviced by the apparatus. This will be true if the apparatus is used in connection with buildings employing radiating heating systems, ordinarily referred to as steam or hot water heating systems; however, as shown in Fig. 8, if a so-called hot air heating system is used, the moisture laden air discharged from the casing A may pass through a duct 62' which leads into the top of the heated air distributing chamber 63 of a standard hot air type of furnace 64. As is well known, such furnaces are equipped with pipes or conduits 65 which lead to the various rooms of a house to be heated. Preferably, I terminate the outlet of the duct 62' in registration with and immediately below the inverted conical top 66 of the furnace 64, so that the moisture laden air will be equally distributed throughout the chamber 63, and uniformly delivered to each of the pipes or conduits 65. This is further insured by the fact that the air passing through the duct 62' is under pressure.

The operation of the apparatus described is preferably under the control of a humidity switch 67 of any standard design. One or more of the switches 67 may be arranged in the room area being heated in order that it may be subjected to the conditions of humidity prevailing in the atmosphere of such a room. The switch 67 may be of the type involving a pivoted mercury containing shell 68 which is positively rocked about its pivot by means of a corrugated actuating strip 69 which is adapted to expand or contract in accordance with the moisture content of the atmosphere surrounding the same. When such moisture content falls below a desired predetermined standard, the strip is operated automatically to move the shell 68 into a position causing the closing of the electric circuits connected with the motor valve 46 and the fan motor 59, whereby both of said motors are energized simultaneously to provide for the operation of the associated burner 40 and the air fan 57. The circuit arrangement shown diagrammatically in Fig. 7 for attaining this end consists of trunk leads 70. A wire 71 extends from one of these leads to the primary windings of a transformer 72 and a return wire 73 extends from the return side of the primary part of the transformer to the return lead 70. The wire 74 leading from the secondary windings of the transformer extends to the mercury shell 68 of the humidity switch and when said switch occupies a circuit closing position, current passes from said shell through a wire 75 to the motor 46 of the gas valve, thereby causing the opening of said valve. A wire 76 leads from the motor 46 to the field winding 77 of a relay 78. The return wire 79 extends from the field 77 to the return side of the secondary winding of the transformer. A hand controlled switch 80 may be arranged in the line 71 to function as a master switch, whereby the system may be rendered operative or inoperative at will. The excitation of the winding 77 results in attracting an armature 81, bringing said armature into engagement with normally spaced contacts 82, so that current may flow from the wire 71 through a continuing wire 83, thence through the armature 81 and by way of a wire 84 to the fan motor 59 and from the motor 59 by way of a return wire 85 to the return trunk lead 70. Therefore, by the provision of the relay 78, the motor fan 59 is energized following the energizing or operation of the automatic gas valve, which may be of any suitable electrically operated type. Preferably, however, the valve 46 includes a manually adjustable knob 86, which may be operated to permit of gas flow if for any reason electrical current should not be available in governing the functioning of the apparatus.

In view of the foregoing, it will be seen that the present invention provides simple, positive and efficient apparatus of an automatically operating character for positively delivering water vapor to the rooms of a building in such quantities as may be necessary in insuring the health and comfort of the occupants thereof. It is generally recognized that heated air low in moisture content is not conducive to the health of those breathing and furthermore while this condition obtains, it is necessary to employ a considerably higher degree of heat for the comfort of the occupants than when a required percentage of moisture or humidity is present. Therefore, not only does the present invention provide apparatus designed to promote the health and comfort of the occupants but it also permits of economy in the operation of associated heating systems, since by the use of the present apparatus, such heating systems may be operated to maintain a lower temperature in said rooms without relatively lower temperatures being noticed by the occupants. The whole system is under the ready control of the manually operated switch shown at 80 in Figs. 1 and 7 and when the apparatus is properly connected with sources of gas, electricity and water supply, readily available in most modern buildings and residences, no attention is required in the control of its operation. It will be understood that the air inlet 60 of the fan casing may contain a suitable filter (not shown) for removing dust or other impurities from the air supplied to the casing A. When used in connection with hot air furnaces of the type shown in Fig. 8, the apparatus improves the operation and efficiency of such a furnace by providing for the enforced circulation of air past its heat radiating surfaces and through its associated heat distributing pipes, producing forced circulation of such heated air instead of mere gravity circulation. The apparatus may be readily installed in connection with a hot air heating system by merely positioning the duct 62' in the upper manifold chamber of the furnace. This can be done readily and without difficulty so that little expense is involved in the matter of installing the apparatus in residences having such heating systems. The apparatus is not limited however to its use in connection with hot air furnaces but, as set forth, may be employed as an independent unit for supplying moisture laden air in radiator type heating systems.

Figure 9:
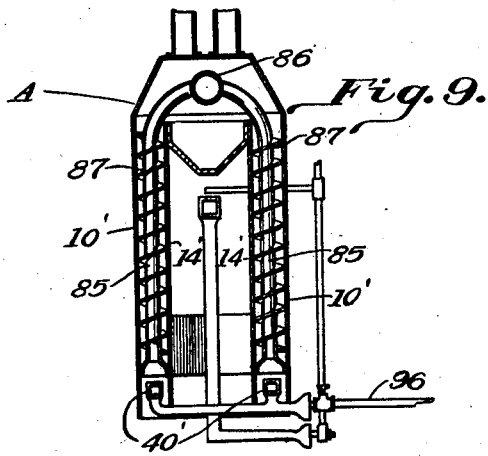
Fig. 9 is a detail vertical sectional view taken through a slightly modified form of heater casing.

A variation of the invention has been disclosed in Fig. 9 wherein is set forth a plurality of auxiliary fuel burners 40' located in the lower portion of the casing and in registration with rows of spaced vertically extending tubes 85 which are arranged between the walls 10' and 14'. The upper ends of the tubes 85 merge in a common header 86 which receives the gases of combustion after the latter have passed through the tubes 85 and have delivered the major portion of their heat to the air circulating around the outer portions of the tubes. These tubes may be provided with baffles 87, if desired, to control to better advantage the contact of the air delivered by the fan 58 to the interior of the casing. The header 86 leads to the gas outlet duct indicated at 53 in Fig. 1.

To govern the operation of the burners 40', a thermostat 90 is arranged in the room area to be heated and under both temperature and humidity control. The thermostat 90 forms a part of an electric circuit which includes wires 91 connected with the terminals 82 and which wires lead to the primary side of a transformer 92. The secondary side of the transformer includes wires 93 which extend to the thermostatic switch 90 and to the windings 94 of a magnetic valve 95, the latter being arranged in a fuel line 96 which delivers fuel to the burners 40'. When the temperature in the room area surroundng the thermostatic switch 90 decreases to a predetermined degree, the switch 90 automatically closes to provide for the opening of the valve 95 permitting of gas or oil flow to the burners 40'. At the same time, the motor 59 is energized to effect the operation of the fan 58 so that when the burners 40' are in active operation, air is positively advanced through the passages of the casing in which the tubes 85 are positioned. The opening of the switch 90 deenergizes the valve 95 causing its closure and arresting active operation of the burners 40'. In this construction, the casing A functions as a self contained heating and air conditioning unit and need not be employed in combination with a standard type of furnace as indicated at 64 in Fig. 8.

What is claimed is:

1. Water vapor generating apparatus for a house heating system, comprising an outer casing having an air outlet at the upper end thereof an inner casing narrower in width positioned centrally of the outer casing to provide air passages therebetween which communicate with said outlet, an open topped water containing trough closing the upper end of said inner casing, a burner arranged within the inner casing, a fuel line leading to said burner, a fuel flow controlling valve in said line, and an electrically driven fan having its outlet side positioned at the lower end of the outer casing and in communication with the air passages therein, whereby the air from said fan will be advanced through said passages and over the open top of said trough and out through the outlet in the upper end of said outer casing.

2. Water vapor generating apparatus for house heating systems, comprising an outer casing having an air outlet at the upper end thereof, an inner casing narrower in width positioned centrally of the outer casing to provide air passages between the walls of said casings, an open topped water receptacle closing the upper end of said inner casing, a fuel burner below said trough and arranged within the inner casing, a fuel line leading to said burner, a controlling valve in said line, an electrically driven fan having its outlet side positioned at the lower end of the outer casing, and a baffle positioned in front of the outlet of said fan and serving to divide the air column issuing from said fan and directing the same into said air passages, the air advancing through said passages and passing over the open top of said trough and out through the outlet in the upper end of said outer casing.

3. In apparatus for controlling the moisture content of the atmosphere of a heated room, an outer casing having an air outlet at the upper end thereof, an inner casing of less width positioned centrally of the outer casing and spaced from the latter to provide air passages therebetween, an open topped water receptacle closing the upper end of said inner casing, a fuel burner below said receptacle and arranged within the inner casing, a fuel line leading to said burner, an electrically controlled valve in said line, an electrically driven fan having its outlet side positioned at the lower end of the outer casing and in communication with the air passages thereof, and a V-shaped baffle positioned in alignment with the outlet from said fan and adapted to divide the column of air issuing through said fan outlet and directing the same around the inner casing and over the open top of the water receptacle for passage out through the outlet in the upper end of the outer casing.

FREDERIC D. PFENING.